US006713984B1

(12) United States Patent
Valdemarsson

(10) Patent No.: US 6,713,984 B1
(45) Date of Patent: Mar. 30, 2004

(54) OPERATING DEVICE FOR DRIVING AND CONTROLLING AN ELECTRICAL SWITCHING APPARATUS

(75) Inventor: Stefan Valdemarsson, Vasteras (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/856,507

(22) PCT Filed: Dec. 16, 1998

(86) PCT No.: PCT/SE98/02339

§ 371 (c)(1), (2), (4) Date: Sep. 10, 2001

(87) PCT Pub. No.: WO00/36621

PCT Pub. Date: Jun. 22, 2000

(51) Int. Cl.[7] .................................................. G05B 1/06
(52) U.S. Cl. ........................ 318/640; 318/560; 318/727
(58) Field of Search ................................ 318/560, 640, 318/727; 74/424.71, 424.73; 355/68, 71

(56) References Cited

U.S. PATENT DOCUMENTS 3,723,922 A * 3/1973 Loewen ....................... 335/68
4,233,858 A * 11/1980 Rowlett ................... 74/424.74
4,912,380 A 3/1990 Zylstra et al.
5,319,295 A 6/1994 Van Patten et al.
5,334,919 A 8/1994 Willard
5,444,348 A * 8/1995 Garrec ......................... 318/640

FOREIGN PATENT DOCUMENTS

EP 0 772 214 5/1997
GB 2 062 380 5/1991

* cited by examiner

*Primary Examiner*—Khanh Dang
(74) *Attorney, Agent, or Firm*—Oblon, Spivak, McClelland, Maier & Neustadt, P.C.

(57) ABSTRACT

The present invention is related to an operating device (200) for driving and controlling the opening and closing of an electrical high voltage or medium voltage switching apparatus, such as a switch or a circuit breaker. The operating device comprises a rotating electric machine (201) which is operatively connected to a mobile contact (203) of the switching apparatus. The rotating electric machine (201) operates the mobile contact via a mechanical coupling (202) upon receiving control signals (208) from a control unit (205). The rotating electric machine (201) may, upon a decelerating motion of the mobile contact (203), transform the kinetic energy of the mobile contact (203) into electrical energy which can be transferred to a suitable energy storage or supply unit (204). The operating device according to the invention is especially suited to operate circuit breakers of all types.

20 Claims, 2 Drawing Sheets

OPERATING DEVICE FOR DRIVING AND CONTROLLING AN ELECTRICAL SWITCHING APPARATUS

TECHNICAL FIELD

The present invention relates to an operating device for driving and controlling the opening and closing of an electrical switching apparatus, such as a switch or a circuit breaker. The said switching apparatus is meant to be used in a high or a medium voltage transmission or distribution network and is thus used at voltages ranging from one kilovolt to several hundreds of kilovolts. The operating device is especially suited to operate circuit breakers of all types, e.g. gas, oil or vacuum isolated circuit breakers of the live tank or dead tank type. The present invention also relates to a medium voltage or a high voltage switching apparatus operated by an operating device of the aforementioned kind, and a method for operating a medium voltage or a high voltage switching apparatus.

BACKGROUND ART

In a power transmission or distribution network, switching apparatuses are incorporated into the network to provide automatic protection in response to abnormal load conditions or to permit opening or closing (switching) of sections of the network. The switching apparatus may therefore be called upon to perform a number of different operations such as interruption of terminal faults or short line faults, interruption of small inductive currents, interruption of capacitive currents, out-of-phase switching or no-load switching, all of which operations are well known to a person skilled in the art.

In switching apparatuses the actual opening or closing operation is carried out by two contacts where normally one is stationary and the other is mobile. The mobile contact is operated by an operating device which comprises an actuator and a mechanism, where said mechanism operatively connects the actuator to the mobile contact.

Actuators of known operating devices for medium and high voltage switches and circuit breakers are of the spring operated, the hydraulic or the electromagnetic type. In the following, operating devices will be described operating a circuit breaker but similar known operating devices may also operate switches.

The spring operated actuator generally uses two springs for operating the circuit breaker; an opening spring for opening the circuit breaker and a closing spring for closing the circuit breaker and re-loading the opening spring. The closing spring is recharged by an electrical motor which is situated in the operating device. A mechanism converts the motion of the springs into a translation movement of the mobile contact. In its closed position in a network the mobile contact and the stationary contact of the circuit breaker are in contact with each other and the opening spring and the closing spring of the operating device are charged. Upon an opening command the opening spring opens the circuit breaker, separating the contacts. Upon a closing command the closing spring closes the circuit breaker and, at the same time, charges the opening spring. The opening spring is now ready to perform a second opening operation if necessary. When the closing spring has closed the circuit breaker, the electrical motor in the operating device recharges the closing spring. This recharging operation takes several seconds.

Although carrying out the task for which they are deigned, spring operated operating devices have several drawbacks. The movement of the mobile contact is exclusively determined by the characteristic of the opening and closing springs and the operating mechanism. Therefore, the distance travelled by the mobile contact as a function of time, i.e. the motion profile according to which the mobile contact moves, cannot be changed by the user, as it is established upon designing the operating device. This means that once the opening or closing spring is released, the mobile contact will follow a predetermined motion profile. In addition, the energy that is supplied to the mobile contact by the actuator is established upon designing the operating device. Therefore it is not possible to adapt the motion of the mobile contact to the type of opening or closing operation that need to be performed. Nor is it possible to alter the motion of the mobile contact by controlling the speed or acceleration of said contact once the opening or closing operation is commenced.

Also, due to the presence of the springs, spring operated actuators are intrinsically poor in precision since they generally comprise a large number of components. The large number of components also requires an initial adjustment of the operating device which is complex and thereby time consuming. The poor precision in positioning the mobile contact and the absence of a control of the motion of the mobile contact may further require the presence of dampers or shock-absorbers to dissipate residual kinetic energy at the end of the opening and the closing stroke and to prevent the circuit breaker from being hit upon in an uncontrolled manner. A further drawback is the high noise levels of known spring operated operating devices, which may require the provision of an acoustic insulation in the housing of the operating device in order to limit environmental impact. Owing to the high number of components, known spring operated operating devices require regular maintenance to maintain the expected behaviour of the operating device and to compensate for variations in the motion of the mobile contact due to wear and ageing of the system. A still further problem is represented by the delay time of the circuit breaker, i.e. the time lapsing between the instant when the operating command is sent to the operating device and the beginning of the movement of the mobile contact of the current breaker. Due to the high number of components the response time in known spring operated operating devices is of the order of several milliseconds (ms).

Operating devices of the hydraulic type, wherein movement of the mobile contact is accomplished by special hydraulic actuators, can partially obviate some of the inconveniences of the spring operated operating device. Nevertheless, the hydraulic operating devices have some disadvantages related to the presence of hydraulic fluids, especially due to the viscosity of the fluids being temperature-sensitive. In addition, with hydraulic operating devices there is a risk of leakage whereby the hydraulic fluids may have impact on the environment. As with spring operated operating devices, hydraulic operating devices generate high noise levels and also require regular maintenance to maintain the expected behaviour of the operating device.

In known electromagnetic operating devices, an actuating force is produced either by the Lorentz force principle or by interacting magnetic fields generated by electromagnets.

The Lorentz force states that if a current carrying conductor is placed in a magnetic field, a force will act upon the conductor. This principle is used, for example, in a voice coil actuator which is known to operate vacuum circuit breakers. Such a voice coil is described in the patent application PCT/US96/07114. The voice coil, however, has one major drawback in the fact that the length of stroke is limited. The use of a voice coil actuator is thus limited to switches and circuit breakers that require only a short stroke.

The magnetic operating device utilises one or a plurality of electromagnets to operate the mobile contact of the circuit breaker. Several designs of magnetic operating devices exist, the operating principle of which is that an electromagnet, operatively connected with the mobile contact, moves between two end positions whereby an air gap in a magnetic circuit is closed or enlarged. An example of such a device, as presented in PCT application PCT/SE96/01341, is described in the following with reference to FIG. 1. The mobile contact of the circuit breaker is operatively connected with a rotary device 101 comprising a number of rotationally symmetrically disposed iron armatures. The rotary device 101 is arranged in an outer stationary iron core 102. To achieve a rotary movement, operating coils 103, that are fixed to the iron core 102 at each armature, are fed with operating currents whereby the rotary device 101 may rotate between two end positions where the electromagnetic pole surfaces of the armature make contact with that of the iron core 102. During the rotary movement, an arm projecting at the armature will move into the operating coil 103, whereby an air gap 104, located between the pole surfaces, is closed or enlarged.

In order to get a sufficient stroke, the air gap in the magnetic operating device must be large. Since a large air gap leads to a high magnetisation energy, the required energy to operate the electromagnetic operating device is large and, since a large air gap needs to be magnetised, the delay time is long. Also, as in the case of the voice coil actuator, the armature may only move between two end positions and the length of the stroke is thus intrinsically limited.

The energy that an actuator delivers to the mobile contact is equal to the force produced by the actuator times the stroke of the actuator or, in the case of a rotating actuator, the torque times the angular movement. In known electromagnetic actuators the stroke or angular movement is intrinsically limited since the movement has end positions. Thus, in order for known actuator to deliver a sufficient amount of energy to the mobile contact, the "force per movement" must be very large.

This causes known electromagnetic actuators to be large, clumsy and expensive, especially when large energies need to be delivered to the mobile contact as is the case in high voltage circuit breaker applications. No mechanical coupling can alter this fact even if the mechanical coupling comprises a gearing device with a suitable transmission ratio.

SUMMARY OF THE INVENTION

A main object of the present invention is to provide an operating device for driving and controlling the opening and closing of a switching apparatus in a high or a medium voltage transmission or distribution network, which enables a mobile contact of the switching apparatus to perform a long stroke in a rapid and controllable manner.

Another object of the invention is to provide an operating device which, upon a decelerating motion of the mobile contact, can feed energy to an energy storage unit.

Yet still another object of the invention is to provide an operating device by which the mobile contact can be moved according to a given desired motion profile, and which motion profile is maintained during a large number of opening and closing operations. Within this object, the operating device can compensate for ageing and wear which strives to alter the motion profile.

Yet still another object of the invention is to provide an operating device with which the mobile contact can be moved according to any of a plurality of unique motion profiles.

Yet still another object of the invention is to provide an operating device with which the speed of the mobile contact can be continuously controlled during the opening or closing operation.

Yet still another object of the invention is to provide an operating device which is mechanically more simple as compared to known operating devices and which is reliable, of relatively simple construction and of low manufacturing cost.

To meet these and other objects, which will become more apparent in the following, the present invention provides an operating device for operating a medium voltage or a high voltage switching apparatus having at least one mobile contact, characterised in that the operating device comprises at least one rotating electric machine which is operatively connected to the mobile contact. With "operatively connected" is understood that the rotating electric machine is connected to the mobile contact without any intermediate energy storing device, such as for example a mechanical spring.

With a rotating electric machine is understood any type of rotating electric device which is able of performing an endless rotating motion. In comparison with known actuators which have end positions, the rotating electric device can rotate a large or even an unlimited number of turns, as well as only a part of a revolution. Due to unlimited angular movement, the rotating electric machine is capable of providing a length of stroke of the mobile contact which is only limited by the design of the connection between the rotating electric machine and the mobile contact.

With an operating device according to the invention, it is possible control the motion of the mobile contact by controlling an operating current which flows through the rotating electric machine. Thus the direction of motion and speed of the mobile contact can be controlled.

According to one embodiment of the invention, the rotating electric machine is operatively connected to the mobile contact via a mechanical coupling comprising a gearing device with a suitable transmission ratio. With such a connection it is possible to exchange actuator torque for angular movement by letting the rotating electric machine rotate one or a plurality of revolutions at each opening or closing operation. By gearing down the angular movement utilising the gearing device, the required actuator torque can be reduced and thereby the size and the cost of the actuator can be reduced as well. Off course, with a rotating electric machine, it is also possible to operate the mobile contact utilising only fractions of a turn, i.e. by letting the rotating electric machine rotate only part of a revolution.

Preferably, the mechanical coupling converts the rotating movement of the rotating electric machine to a transversal movement of the mobile contact, but the mechanical coupling may alternatively convert the rotating movement of the rotating electric machine to a rotating movement of the mobile contact.

According to another embodiment of the invention, the rotating electric machine operates the mobile contact directly, i.e. the mobile contact is directly connected to a rotating axis of the rotating electric machine.

According to yet another embodiment of the invention, the rotating electric machine comprises a plurality of rotating electric machines which are operatively connected to the mobile contact.

According to yet another embodiment of the invention, the rotating electric machine can operate as a generator as well as an actuator. When operated, the mobile contact is initially accelerated. During this acceleration phase the rotating electric machine operates as an actuator, accelerating the mobile contact. Towards the end of the stroke, the mobile contact enters a deceleration phase when the mobile contact is decelerated. In this deceleration phase the rotating electric machine operates as a generator whereby the rotating electric machine, upon a decelerating motion of the mobile contact, produces electric energy by transforming the kinetic energy of the mobile contact into electric energy.

By decelerating the mobile contact by operating the rotating electric machine as a generator, a number of advantages can be obtained. Firstly, the electric energy produced by the rotating electric machine can be transferred to an energy storage unit, e.g. a battery, a set of capacitors, a set of super capacitors or an electrical network. Accordingly, the electric energy can be used to accelerate the mobile contact during a subsequent acceleration phase. Thereby the total amount of energy required to operate the mobile contact can be reduced. Preferably the energy storage unit is the same energy supply unit from which the operating device normally receives energy to accelerate the mobile contact. Secondly, by decelerating the mobile in this manner, the need for mechanical dampers is obviated. Thereby the mechanical design of the operating device can be simplified. Thirdly, the motion of the mobile contact during the deceleration phase can be controlled in a manner that is not possible by using known mechanical dampers.

Instead of storing the electric energy produced by the rotating electric machine in an energy storage unit, the electric energy can be dissipated in an ohmic device whereby the kinetic energy of the mobile contact is transformed into heat.

The acceleration phase does not immediately have to be followed by the deceleration phase. An intermediate phase, when the mobile contact is nor accelerated nor decelerated but continues its motion due to the force of inertia, may follow the acceleration phase but precede the deceleration phase.

According to one embodiment of the invention, the movement of the rotating electric machine is controlled by a control unit. The control unit controls the operating current which flows through the rotating electric machine and thereby the motion of the mobile contact is controlled by the control unit. By means of the control unit the mobile contact can be operated with great accuracy and a desired motion of the mobile contact can easily be obtained. For example, by utilising the control unit, the influence of wear and ageing on the motion of the mobile contact can be compensated for.

According to another embodiment of the invention, the control unit comprises a data processing means, such as a central processing unit (CPU), and a data storage means which is capable of storing a plurality of unique motion profiles. Preferably, one motion profile for every type of opening/closing situation that may occur in the electrical network is stored in the data storage means. Information about the condition of the electrical network, e.g. from monitoring apparatuses such as instrument transformers, or instructions from an operator, are supplied to the control unit. When the switching apparatus is called upon to operate, the information and/or the instructions are analysed by the data processing means. Based on the analysis, a suitable motion profile is chosen from those stored in the data storage means and the rotating electric machine is made to operate the mobile contact according to the chosen motion profile. Thus, when a particular switching operation is required, the operating device can provide a switching operation with a motion profile which is adapted to the specific type of condition of the network.

According to yet another embodiment of the invention, the control unit continuously during a opening or closing operation controls the angular velocity of the rotating electric machine. Thereby the speed and acceleration of the of the mobile contact can be altered continuously during the opening or closing operation. The control current, which is sent to the rotating electric machine, is controlled utilising an algorithm implemented in the data processing means. Suitable input to the algorithm is information from an operator, information about the electrical network in general, e.g. voltages and current values from strategically placed instrument transformers, or information about the switching apparatus, e.g. the current flowing through the switching apparatus, the voltage between the mobile and the stationary contact or, in the case of the switching apparatus being a circuit breaker, the arc voltage. Other suitable input to the algorithm is information about the position, speed and acceleration of the rotating electric machine and/or the mobile contact. Such information can, by means of feedback loops, be supplied to the control unit by position and motion sensors placed on the rotating electric machine and on the mobile contact.

Further features and advantages of the present invention will become apparent from the following description of the invention.

BRIEF DESCRIPTION OF THE DRAWINGS

In the following text the invention will be described with reference to the attached drawings, in which.

DETAILED DESCRIPTION OF THE INVENTION

Figure 1:
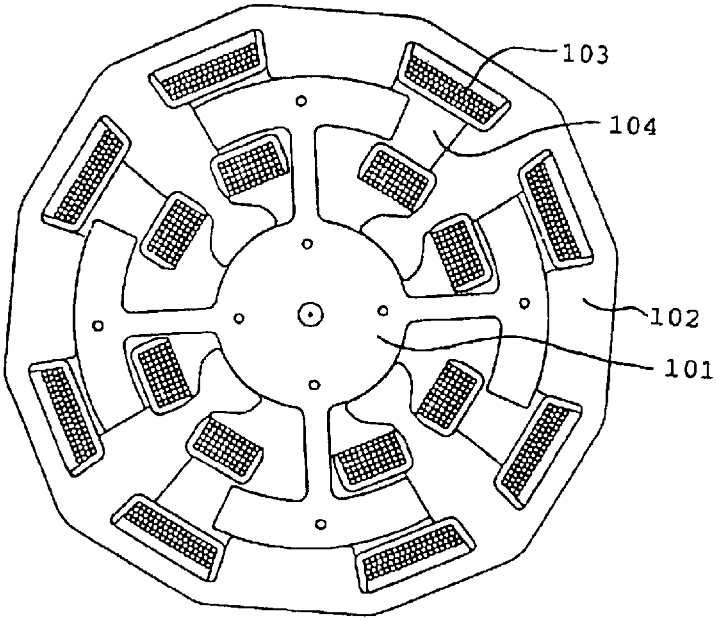
FIG. 1 PRIOR ART
FIG. 1 shows a schematic view of a known magnetic actuator.
Figure 2:
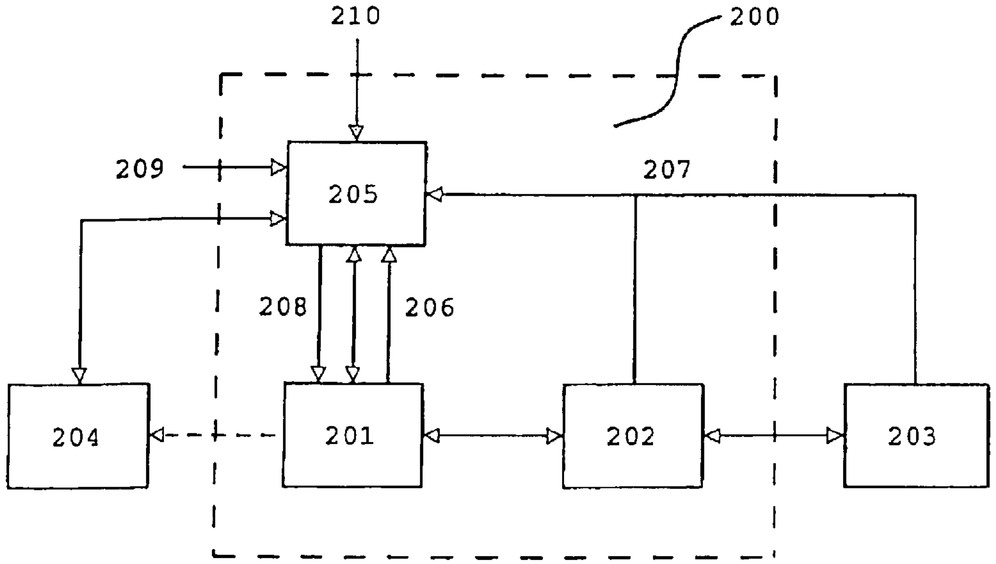
FIG. 2 shows a block diagram of an operating device according to one embodiment of the invention, and FIG. 3 schematically shows a schematic view of a rotating electrical machine according to the invention operating a switching apparatus.

A block diagram of one embodiment of an operating device according to the present invention is shown in FIG. 2. The operating device 200 comprises a rotating electric machine 201 which, via a mechanical coupling 202, is operatively connected to a mobile contact 203 of a switching apparatus. The mechanical coupling 202 transforms the rotational movement of the rotating electric machine 201 into a translation movement of the mobile contact 203. The mechanical coupling 202 comprises a gearing device which gears down the angular movement of the rotating electric machine using a suitable transmission ratio. The rotating electric machine is supplied by an energy supply unit 204 via a control unit 205. The energy supply unit can be a network, a battery, a set of capacitors, a set of super capacitors or some other type of energy supply device. The control unit 205, which comprises a data processing means and a data storage means, controls the movement of the rotating electric machine 201 by sending a control current, 208, to the same. The operating device comprises means whereby information 210 about the condition of the electrical network, e.g. from monitoring apparatuses such as instrument transformers, or instructions 209 from an operator, are transferred to the control unit. Information about the position, acceleration, torque and/or angular velocity of the rotating electric machine 201 is transferred to the control unit 205 via a first feedback loop 206. Also, information about the position, acceleration and/or speed of the mobile contact 203 and/or the mechanical coupling 202 is transferred to the control unit 205 via a second feedback loop 207.

By means of the control unit 205 it is possible, in a simple and flexible manner, to control the motion of the mobile contact as, for example, a function of the condition of the network (e.g. no load switching, switching of inductive/capacitive loads, interruption of different types of short circuit faults etc.). It is also possible, in advance of an operation, to set the accuracy whereby the mobile contact should be moved. Thereby the risk of passing the end-of-stroke positions may be reduced. In addition, it is by means of the control unit 205 and the feedback loops 206, 207 possible to compensate for changes in the friction of the system due to wear or ageing. This may be achieved by programming the motion of the mobile contact to change as a function of the feedback information. Alternatively, this may be achieved by programming the motion of the mobile contact to change as a function of time or number of operations, in which case the feedback loops are not necessary.

When operated the mobile contact 203 is initially accelerated. During this acceleration phase the rotating electric machine 201 operates as an actuator, accelerating the mobile contact 203. Depending on the desired motion profile, the acceleration phase may be followed by an intermediate phase when the rotating electric machine 201 does not drive the mobile contact 203, but when the mobile contact 203 continues its motion due to the force of inertia. Towards the end of the stroke, the mobile contact 203 enters a deceleration phase when the mobile contact 203 is decelerated. In this deceleration phase the rotating electric machine 201 may be operated as a generator whereby the kinetic energy of the mobile contact is transformed into electric energy which, directly or via the control unit 205, can be transferred back to the energy supply unit 204 or to a energy storage unit. This is indicated in FIG. 2 by the double headed arrows and by the dashed arrow going from the rotating electric machine 203 to the energy supply unit 204. Alternatively, the electric energy can be dissipated in ohmic devices whereby the kinetic energy of the mobile contact is transformed into heat. By decelerating the mobile in this manner, the need for mechanical dampers is obviated.

By means of the control unit 205, the duration of the acceleration phase, the intermediate phase and the deceleration phase can be controlled in detail. In some opening or closing operations, for example, the intermediate phase may be excluded whereby the acceleration phase immediately is followed by the deceleration phase. In other operations there may be two or more acceleration and/or deceleration phases separated by intermediate phases.

The rotating electric machine 201 can be any type of conventional rotating electric machine such as a stepping motor, an AC motor of the induction type or an AC motor of the synchronous type such as for example a reluctance motor, a DC motor, an AC or a DC permanent magnet motor. By using an "off the shelf" conventional rotating electric machine, the operating device according to the invention can be made extremely inexpensive. However, to meet with the severe requirements of some switching applications, especially in high voltage circuit breaker applications, the conventional electric machine must be operated in a special manner. This will be illustrated in the following.

An apparatus seemingly similar to an operating device according to the invention is a conventional electric motor operating a disconnector. A disconnector is an electrical apparatus which in the open position provides an isolating distance in an electrical network. The disconnector is able to switch negligible currents, e.g. currents having values $\leqq 0.5$ Ampere (A), but it is not, as compared to switching apparatuses as switches and circuit breakers, able to switch or interrupt load currents occurring under normal or abnormal conditions in the network. A switch must at least be able to switch and interrupt load currents under normal conditions in the network. A circuit breaker, in addition, must be able to switch and interrupt currents arising under defined abnormal conditions, e.g. terminal faults, short-line faults, out-of-phase switching, interruption of small inductive currents and switching of capacitive currents, all of which said fault types are well known to a person skilled in the art. All of the fault types require the circuit breaker to operate rapidly soon after the detection of the fault. Thus, in medium and high voltage switching apparatus applications, a large quantity of mechanical work need to be performed in a very short period of time. Whereas an opening or closing operation of a motor operated disconnector takes several seconds, the opening/closing operation of a switching apparatus must be performed within a few ms. For example, in a high voltage circuit breaker application, the operating device may have to be able to deliver up to 2000 Joule per pole to the circuit breaker within a period of 15 ms. The requirements on an operation device operating a disconnector are therefore not in any way comparable to the requirements on an operating device operating a switch or a circuit breaker.

A conventional electric motor in a conventional application is normally not operated for periods of time less than 0.5 ms. Nor is conventional electric motor in a conventional application operated with a current density in the armature windings exceeding 5–10 $A/mm^2$. If so, the electric motor would be damaged due to the heat generated by the current in the windings. However, in a rotating electric machine in an operating device according to the invention, armature winding current densities exceeding 50–200 $A/mm^2$ are used because these current densities are needed to meet with the requirements on an operating device operating a switching apparatus. It is possible to use a conventional rotating electric machine in a switching apparatus according to the invention since the rotating electric machine never has to operate for periods of time longer than 40–60 ms. Preferably, however, to a rotating electric machine in a switching apparatus according to the invention is adapted according to the following.

To illustrate the requirements on an operating device according to the present invention, a somewhat simplified theoretical description of the forces acting on the rotating electric machine in an opening or closing operation of the operating device will be given below. The description is given with reference to FIG. 3 whereby the following notation are used:

J [$kgm^2$] moment of inertia of the disk representing the mobile contact $J_m$ [$kgm^2$] moment of inertia of the rotor representing the rotating electrical machine f [$N/m^2$] constant surface force density of the rotor R [m] radius of the rotor l [m] length of the rotor ρ[kg/$^3$] density of the rotor Φ[rad] angle of rotation of the rotor

[rad] angle of rotation of the disk $\mu_m$ [Nm] constant torque produced by the rotating electrical machine $\mu$[Nm] constant torque acting on the disk representing the switching apparatus E [J] energy transferred to the disk representing the mobile contact at the time t J (Joule)

m (meter)

s (second)

N (newton)

kg (kilogram)

rad (radian)

Figure 3:
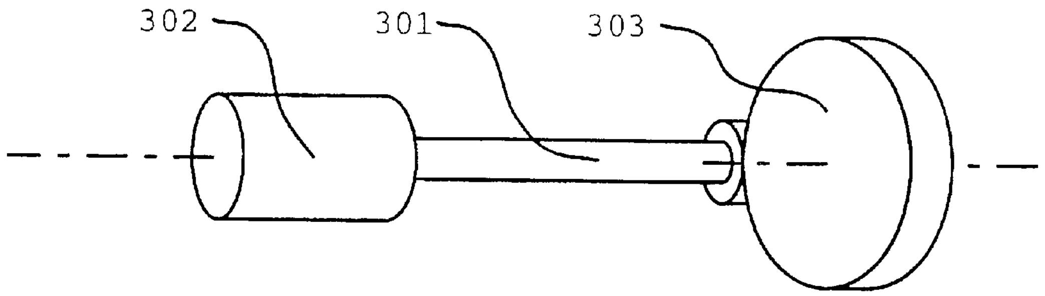

FIG. 3 schematically shows a view of a rotating electrical machine operating a switching apparatus via a kinetic coupling 301 comprising a gearing device having a transmission ratio of 1:α. The rotating electrical machine is schematically represented by a cylindrically shaped rotor 302. The rotor has a radius of R, a length of l, and a density of ρ. The moment of inertia of the rotor is:

$$J_m = \frac{1}{2}\rho\pi R^4 l \tag{1}$$

Assuming a constant torque, the torque produced by the rotating electrical machine is:

$$\mu_m = 2\pi R^2 lf \tag{2}$$

Here f is the surface force density acting on the surface of the rotor in a tangential direction. The switching apparatus is schematically represented by a disk 303 and by rotating the disk 303 the mobile contact of the switching apparatus is operated. The disk 303 has a moment of inertia of J which represents the moment of inertia of the mobile contact of the switching apparatus. The moment of inertia of the mechanical coupling 301 is integrated with the moment of inertia of the disk 303, J.

Supposing the angle of rotation of the rotor 302 is Φ and the angle of rotation of the disk 303 is θ, the acceleration of the disk 303 is governed by the equation:

$$\ddot{\theta} J = \mu \tag{3}$$

$$\Longrightarrow \ddot{\varphi}\frac{J}{\alpha} = \mu \tag{4}$$

The acceleration of the rotor 302 is governed by the equation:

$$\ddot{\varphi} J_m = \mu_m - \frac{1}{\alpha}\mu = \mu_m - \frac{1}{\alpha}\frac{J}{\alpha}\ddot{\varphi} \tag{5}$$

$$\Rightarrow \ddot{\varphi}\left(J_m + \frac{J}{\alpha^2}\right) = \mu_m \tag{6}$$

$$\Rightarrow \dot{\varphi} = \frac{\mu_m t}{J_m + \frac{J}{\alpha^2}} = \frac{2\pi R^2 lft}{\frac{1}{2}\rho\pi R^4 l + \frac{J}{\alpha^2}} \tag{7}$$

-continued $$\Rightarrow R^2 = \frac{2ft}{\rho\dot{\varphi}}\left\{1 - \sqrt{1 - \frac{J\rho\dot{\varphi}^2}{2\pi\alpha^2 lf^2t^2}}\right\} \tag{8}$$

Here the double dot above the θ and the Φ means "second time derivative of" and the single dot above the Φ means "first time derivative of".

For simplicity it is assumed that all the energy delivered by the rotor 302 is transformed into kinetic energy of the disk 303. Then the energy transferred to the rotating disk is:

$$E = \frac{1}{2}\dot{\theta}^2 J = \frac{1}{2}\frac{1}{\alpha^2}\dot{\varphi}^2 J = \frac{1}{2}\dot{\varphi}^2\frac{J}{\alpha^2} \tag{9}$$

$$\Rightarrow \dot{\varphi} = \alpha\sqrt{\frac{2E}{J}} \tag{10}$$

This put into equation (8) yields:

$$R^2 = \frac{2ft}{\rho\alpha}\sqrt{\frac{J}{2E}}\left\{1 - \sqrt{1 - \frac{E\rho}{\pi lf^2t^2}}\right\} \tag{11}$$

Since the expression under the square root sign must be equal or larger than 0 it follows that:

$$\sqrt{\frac{E\rho}{\pi lt^2f^2}} \le 1 \tag{12}$$

$$\Rightarrow f \ge \sqrt{\frac{E\rho}{\pi lt^2}} \tag{13}$$

Equation (13) thus gives the minimum constant surface force density of the rotor required to deliver the energy E to the mobile contact in the time period t.

For a typical large high voltage circuit breaker the mobile contact must acquire a speed of roughly 9 m/s in the time period of 15 ms. Thus, given that the mass of the mobile contact is roughly 20 kg, the energy stored in the mobile contact (the disk) is roughly:

$$E = \frac{1}{2}mv^2 \approx \frac{1}{2}\cdot 20\cdot 9^2 \approx 810 \text{ Joule}$$

Assuming that the rotor has the length of 20 cm and a density of 7900 g/cm$^3$ (magnetic iron), the minimum surface force density required to accelerate the mobile contacts of a three-pole high voltage circuit breaker to 9 m/s in 15 ms is according to equation (13) roughly:

$$f \ge \sqrt{\frac{3\cdot 810\cdot 7900}{\pi\cdot 20\cdot 10^{-2}\cdot(15\cdot 10^{-3})^2}} \approx 0.4 \text{ N/mm}^2$$

It should be noted that the required surface force density of a motor operating a disconnector is much lower than 0.4 N/mm$^2$.

Conventional electrical motors in conventional applications, such as a motor operating a disconnector, are only capable of producing a surface force density in the order of 0.05 N/mm$^2$. This because an conventional electrical motor in a conventional application must be design to operate for time periods longer than 1 second and that thermal design criteria requires the armature electric loading not to exceed 100 A/cm.

For an electrical motor capable of producing a given surface force density, the energy produced by the motor can be increased if the length of the rotor is increased. In table 1 approximate energy values required to operate circuit breakers of different sizes are shown together with the rotor length, l required to produce those energies assuming that the conventional electric motor is capable of producing a surface force of 0.05 $N/m^2$. The rotor lengths are estimated using equation 13 and the time period, t, of the operation is assumed to be 15 ms. Also shown in table 1 is the surface forces, f, required to be produced assuming that the rotor of the rotating electric machine is to be no longer than 0.2 m.

TABLE 1

| | 36 kV | | 145 kV | | 245 kV | |
|---|---|---|---|---|---|---|
| | One pole | Three poles | One pole | Three poles | One pole | Three poles |
| E [J] | 30 | 100 | 200 | 600 | 800 | 2500 |
| l [m] (assuming f = 0.05 N/mm2) | 0.1 | 0.5 | 1.0 | 2.7 | 3.6 | 11.2 |
| f [$N/mm^2$] assuming l = 0.2 m) | 0.04 | 0.07 | 0.11 | 0.18 | 0.21 | 0.37 |

As can be seen in table 1, up to roughly 36 kV it is theoretically possible to use conventional electric motors to operate circuit breakers. In electrical networks with a rated voltage above 36 kV, however, it is not technically or economically possible to use such motors since the rotors need to be extremely long. As can be seen in table 1, equation 13 yields that a rotating electric machine with a rotor length of 0.2 m need to produce a surface force in the order of ≈0.4 $N/mm^2$ to be able to supply a circuit breaker with 2500 J in 15 s. For even bigger circuit breakers a surface force of up to 0.5 N/mm2 may be required. Therefore, the surface force of a rotating electric machine comprised in an operating device according to the invention should be in the region 0.05–0.5 $N/mm^2$, and preferably 0.05–0.75 N/mm2.

In a rotating electric machine comprised in an operating device according to the invention it is possible to obtain surface force densities in the order of 0.5 $N/mm^2$ since the device need not be operated for time periods exceeding 1 s. This means that the rotating electric machine can be designed without having to consider thermal design criteria and thus, in such a machine a current sheet density of up to 5000 A/cm can be allowed, which is higher than what is allowable in conventional electrical motors in conventional applications. By increasing the current sheet density, the surface force density can be increased to the values required to operate the switch or circuit breaker. Therefore, the current sheet density of a rotating electric machine comprised in an operating device according to the invention should be in the region 500–5000 A/cm, and preferably 500–15000 A/cm.

It will be appreciated that many modifications and variations of the present invention are possible in light of the above teachings without departing from the spirit and intended scope or the invention. It is understood that the operating device according to the invention can be used to operate switching apparatuses having three poles as well as one pole.

What is claimed is:

1. An operating device for a rapid operation of a medium voltage or a high voltage switching apparatus having at least one mobile contact, comprising:

a rotating electric machine which is operatively connected to the at least one mobile contact and an electric energy supply unit; and a control unit, wherein the operating device operates according to an operating cycle which includes a first part in which the at least one mobile contact is accelerated by transforming electric energy into mechanical energy and a second part in which the at least one mobile contact is decelerated by transforming mechanical energy into electric energy for storage into the energy supply unit.

2. The operating device according to claim 1, wherein a motion in between the first part and the second part includes an intermediate part where the at least one mobile contact is continuing in motion because of the force of inertia.

3. The operating device according to claim 1, wherein the rotating electric machine is any of: an AC motor of the induction type, an AC motor of the synchronous type, a DC motor, an AC permanent magnet motor, a DC permanent magnet motor or a stepping motor.

4. The operating device according to claim 1, wherein the rotating electric machine is operatively connected to the at least one mobile contact via a mechanical coupling.

5. The operating device according to claim 4, wherein the mechanical coupling includes a gearing device.

6. The operating device according to claim 1, wherein the energy supply unit is any of: a network, a battery, a set of capacitors or a set of super capacitors.

7. The operating device according to claim 1, wherein the rotating electric machine operates the at least one mobile contact upon receiving control signals from said control unit.

8. The operating device according to claim 7, further comprising a communication unit configured to transfer information about a condition of the electrical network or information from an operator to the control unit.

9. The operating device according to claim 1, wherein the control unit includes a data storage unit and a data processing unit.

10. The operating device according to claim 9, wherein a plurality of motion profiles are stored in the data storage unit and upon an opening or closing operation, a suitable motion profile is chosen by the data processing unit based on information about the condition of the electrical network.

11. The operating device according to claim 9, wherein information about the position, acceleration, torque and/or angular velocity of the rotating electric machine is transferred to the control unit via a first feedback loop.

12. The operating device according to claim 9, wherein information about the position, acceleration and/or speed of the at least one mobile contact is transferred to the control unit via a second feedback loop.

13. The operating device according to claim 12, wherein an angular velocity of the rotating electric machine is controlled continuously during the opening or closing operation by an algorithm implemented in the data processing unit, and an input to said algorithm is any of:

information about the condition of the electrical network or information from an operator, information about the position, acceleration, torque and/or angular velocity of the rotating electric machine which is transferred to the control unit via the first feedback loop, or information about the position, acceleration and/or speed of the at least one mobile contact which is transferred to the control unit via the second feedback loop.

14. The operating device according to claim 1, wherein the rotating electric machine produces a surface force density in the region 0.05–0.75 N/$mm^2$.

15. The operating device according to claim 1, wherein the rotating electric machine has a current sheet density in the region 500–15000 A/cm.

16. The operating device according to claim 1, wherein the rotating electric machine has armature winding current densities exceeding 50–200 A/$mm^2$.

17. A method for a rapid opening or closing motion of a medium voltage or a high voltage switching apparatus having at least one mobile contact and an operating device including a rotating electric machine in operational connection with the at least one mobile contact and an energy supply unit, comprising:

accelerating the at least one mobile contact under a first part of the rapid opening or closing motion by transforming electric energy into mechanical energy;

decelerating the at least one mobile contact under a second part of the rapid opening or closing motion by transforming mechanical energy into electric energy; and storing transformed electric energy in the energy supply unit.

18. The method according to claim 17, wherein the rapid opening or closing motion of the at least one mobile contact, in addition to the first and second part, includes an intermediate part where the at least one mobile contact is continuing in motion because of the force of inertia.

19. The operating device according to claim 1, wherein the operating device interfaces with a high voltage or a medium voltage transmission or distribution network.

20. An operating device for a rapid operation of a medium voltage or a high voltage switching apparatus having at least one mobile contact, comprising:

a rotating electric machine operatively connected to the at least one mobile contact and an electric energy supply; and means for controlling the at least one mobile contact to accelerate during a first part of an operating cycle by transforming electric energy into mechanical energy and decelerate during a second part by transforming mechanical energy into electric energy for storage into the energy supply.

* * * * *